United States Patent
Jiang et al.

(10) Patent No.: US 9,821,435 B2
(45) Date of Patent: Nov. 21, 2017

(54) THICK CUBIC BORON NITRIDE (CBN) LAYER AND MANUFACTURING PROCESS THEREFOR

(75) Inventors: Wenping Jiang, Fayetteville, AR (US); Ajay P. Malshe, Springdale, AR (US)

(73) Assignee: NanoMech, Inc., Springdale, AR (US)

( * ) Notice: Subject to any disclaimer, the term of this patent is extended or adjusted under 35 U.S.C. 154(b) by 412 days.

(21) Appl. No.: 14/119,789

(22) PCT Filed: May 29, 2012

(86) PCT No.: PCT/US2012/039892
§ 371 (c)(1),
(2), (4) Date: Mar. 20, 2014

(87) PCT Pub. No.: WO2012/166745
PCT Pub. Date: Dec. 6, 2012

(65) Prior Publication Data
US 2014/0215925 A1    Aug. 7, 2014

Related U.S. Application Data

(60) Provisional application No. 61/490,730, filed on May 27, 2011, provisional application No. 61/490,719, filed on May 27, 2011.

(51) Int. Cl.
*B24D 3/06* (2006.01)
*B23B 27/14* (2006.01)
(Continued)

(52) U.S. Cl.
CPC .............. *B24D 3/06* (2013.01); *B23B 27/141* (2013.01); *B23B 27/143* (2013.01);
(Continued)

(58) Field of Classification Search
CPC ....... B23B 27/14; B23B 27/20; B23B 27/141; B23B 27/143; B23B 27/148; B24D 3/00;
(Continued)

(56) References Cited

U.S. PATENT DOCUMENTS 3,982,911 A    9/1976  Lee
4,526,673 A    7/1985  Little et al.
(Continued)

FOREIGN PATENT DOCUMENTS

| JP | 6335456 | 2/1988 |
| JP | 2007-112699 | 5/2007 |
| WO | 2006046128 A1 | 5/2006 |

OTHER PUBLICATIONS

Machine-based English translation of Japanese Patent Publication No. 2007-112699.
(Continued)

*Primary Examiner* — Jennifer A Smith
*Assistant Examiner* — Alexandra M Moore

(57) ABSTRACT

A method for forming a stand-alone wafer or a coating on a substrate uses a composite of cubic boron nitride (cBN) particles and other materials, such as nitrides, carbides, carbonitrides, borides, oxides, and metallic phase materials. The wafer or coating may be formed of a thickness up to about 1000 microns for improved wear life. The density of material within the wafer or coating may be varied according to desired parameters, and a gradient of particle sizes for the cBN may be presented across the thickness of the material.

32 Claims, 4 Drawing Sheets

(51) Int. Cl.
- C23C 30/00 (2006.01)
- C23C 28/04 (2006.01)
- B24D 18/00 (2006.01)
- C04B 35/5831 (2006.01)

(52) U.S. Cl.
CPC ........ B23B 27/148 (2013.01); B24D 18/0009 (2013.01); C04B 35/5831 (2013.01); C23C 28/044 (2013.01); C23C 30/005 (2013.01); *B23B 2200/081* (2013.01); *B23B 2200/087* (2013.01); *B23B 2200/204* (2013.01); *B23B 2200/205* (2013.01); *B23B 2228/10* (2013.01); *C04B 2235/3217* (2013.01); *C04B 2235/3843* (2013.01); *C04B 2235/3856* (2013.01); *C04B 2235/3886* (2013.01); *C04B 2235/604* (2013.01); *C04B 2235/614* (2013.01); *C04B 2235/665* (2013.01); *C04B 2235/667* (2013.01); *Y10T 407/24* (2015.01); *Y10T 407/27* (2015.01); *Y10T 428/265* (2015.01)

(58) Field of Classification Search
CPC .......... B24D 3/06; C09K 3/14; C09K 3/1409; C09K 3/1436; C09K 3/1445; E21B 10/00; E21B 46/00; E21B 10/54; E21B 10/55; Y10T 428/249953; Y10T 407/26–407/28; C23C 24/01; C23C 24/103; C23C 24/106; C04B 35/00; C04B 35/58; C04B 35/583; C04B 35/5831
See application file for complete search history.

(56) References Cited

U.S. PATENT DOCUMENTS

| | | | | |
|---|---|---|---|---|
| 4,593,007 A | * | 6/1986 | Novinski | C23C 4/06 427/447 |
| 4,988,421 A | * | 1/1991 | Drawl | C23C 14/06 204/192.16 |
| 5,211,726 A | | 5/1993 | Slutz et al. | |
| 5,670,252 A | | 9/1997 | Makowiecki et al. | |
| 5,897,751 A | * | 4/1999 | Makowiecki | B82Y 10/00 204/192.15 |
| 6,054,185 A | | 4/2000 | Inspektor | |
| 6,410,086 B1 | | 6/2002 | Brandon et al. | |
| 6,540,800 B2 | * | 4/2003 | Sherman | C09K 3/1445 51/293 |
| 6,599,062 B1 | | 7/2003 | Oles et al. | |
| 6,607,782 B1 | * | 8/2003 | Malshe | C04B 35/5626 427/189 |
| 6,790,543 B2 | | 9/2004 | Kubota et al. | |
| 7,264,883 B2 | | 9/2007 | Yamamoto et al. | |
| 2002/0112408 A1 | * | 8/2002 | Rolander | C22C 1/051 51/307 |
| 2005/0041373 A1 | * | 2/2005 | Pruss | C01B 21/064 361/508 |
| 2005/0210755 A1 | | 9/2005 | Cho et al. | |
| 2006/0199013 A1 | * | 9/2006 | Malshe | B22F 7/06 428/409 |
| 2007/0175103 A1 | * | 8/2007 | Sigalas | B22F 7/02 51/298 |
| 2008/0302023 A1 | | 12/2008 | Goudemond et al. | |
| 2010/0069225 A1 | | 3/2010 | Kountanya et al. | |
| 2011/0020081 A1 | | 1/2011 | Webb et al. | |

OTHER PUBLICATIONS

Machine-based English translation of claims from Japanese Patent Publication No. JPS63 (1988)-035456(A).

Partial supplementary European search report for EP Application No. 12794064.1 (dated Dec. 4, 2014).

* cited by examiner

THICK CUBIC BORON NITRIDE (CBN) LAYER AND MANUFACTURING PROCESS THEREFOR

CROSS-REFERENCE TO RELATED APPLICATIONS

This application claims priority from U.S. provisional patent application No. 61/490,730, filed May 27, 2011, and entitled "Multiple-Layer Coating and/or Film Configuration Consisting of Cubic Boron Nitride (cBN) Particles"; and U.S. provisional patent application No. 61/490,719, also filed May 27, 2011, and entitled "Fabrication Process for Thick Cubic Boron Nitride (cBN) and Other Ceramic Based Coating and Film." Such applications are incorporated by reference as if set forth fully herein.

STATEMENT REGARDING FEDERALLY SPONSORED RESEARCH OR DEVELOPMENT

Not applicable.

BACKGROUND OF THE INVENTION

Coatings are effective for improving the performance of various materials, such as for achieving better wear resistance and corrosion resistance. Common applications where a coating is applied to a substrate to improve wear resistance of the substrate material include cutting tool inserts for the cutting of hard materials, such as steel. Common substrate materials for cutting tools may include, for example, hard metals of different particle sizes with a varied percentage of cobalt or nickel as a binder material.

Boron nitride (BN) is a well-known material that, due to its thermal and chemical stability, is widely used in the fabrication of parts for high-temperature applications. It exists amorphously and in several crystalline forms. Cubic boron nitride (cBN) is a crystalline form that, due to its very high hardness value and relatively low cost, is widely used in various cutting applications as an abrasive. Since it is relatively insoluble in iron, nickel, and related alloys at high temperature, it is widely used in place of diamond for the cutting and machining of steel.

The art also includes various methods of coating parts—such as inserts for cutting tools and machines—with one or more layers of cBN. The process used has been the application of cBN in pure, non-composite phase. This application of cBN layer by vapor deposition is made with a coating thickness limited to less than about 3 microns. Attempts to form thicker layers of cBN have resulted in poor performance, since the high stress at the coating-substrate interface leads to coating delamination, thereby reducing the life of a cutting tool or other coated material. It would be highly desirable to develop a method of applying a thicker cBN coating that would not delaminate, due to the improved toughness, thermal stability, and wear resistance that would result from a thicker cBN layer.

The inventors hereof have previously developed a method of forming a cBN composite layer on a substrate that has a greater thickness, up to about 20-30 microns, which is a range desirable for a number of applications, particularly turning applications. This process, however, has limitations with respect to its flexibility in controlling the density of the cBN composite layer, and with respect to increasing the thickness of the layer beyond this range. It would be desirable to develop an even thicker layer of cBN for certain applications, such as coatings used for certain parts used in deep oil and gas drilling, where a coating thickness of greater than a few hundred microns is typically desired. In addition, there have also been high-temperature, high-pressure (HT-HP) processes applied to the development of polycrystalline cubic boron nitride (p-cBN) tools. This approach is limited, however, to production of in-bulk materials, that is, materials with thicknesses in the millimeter range in the form of discs or wafers. These materials must be diced to certain dimensions and shapes in order to be brazed to other bodies in order to be used as a coating material. The brazing process requires that the thickness of the materials be typically greater than 1.0 mm. Finally, the prior art does not include means of producing cBN particles with a gradient of particle sizes in a cBN composite coating, which the inventors hereof believe may be desirable for certain applications, particularly where balanced toughness and hardness are desirable.

CVI is a known process for the deposition of one or more materials within an existing body of porous material matrix. It is a variation of chemical vapor deposition (CVD), which uses a similar process for the deposition of a material onto a surface. CVI has been used, for example, in the deposition of materials onto and into a material that is composed of porous fibers. To the inventors' knowledge, however, CVI has not been used in a process for forming a composite layer comprising cBN particles wherein a cBN layer is infiltrated with another material to form a composite.

BRIEF SUMMARY OF THE INVENTION

The invention is directed to a method for fabricating a thick cubic boron nitride (cBN) based composite coating or film. The coating or film may be applied to a substrate or a stand-alone after the substrate is removed (without a substrate). The thickness of the coating may be in the range of a few tens of microns up to 1000 microns.

In a first aspect, the invention is directed to a method for fabricating a hard composite, comprising the steps of depositing in a form a composite material comprising (i) a plurality of cubic boron nitride (cBN) particles, or (ii) a mixture of a plurality of cBN particles and other particles selected from the group consisting of nitrides, carbides, carbonitrides, borides, oxides, and metallic phases, applying a mechanical press to the composite material in the form whereby the composite material is compressed, and applying a consolidation process to the composite material in the form, wherein the consolidation process is selected from the group consisting of chemical vapor infiltration (CVI), microwave sintering, and pulsed infrared (IR) heating.

In a second aspect, the invention is directed to a composite layer of material, comprising cubic boron nitride (cBN) particles, and other particles selected from the group consisting of nitrides, carbides, carbonitrides, borides, oxides, and metallic phases, wherein the cBN particles and other particles are consolidated into the layer, and further wherein the thickness of the layer is greater than 30 µm.

In a third aspect, the invention is directed to a coated material, comprising cubic boron nitride (cBN) particles, other particles in a mixture with the cBN particles to form a composite coating layer, the other particles selected from the group consisting of nitrides, carbides, carbonitrides, borides, oxides, and metallic phases, and a block beneath the composite coating layer, wherein the layer thickness is greater than 30 µm.

These and other features, objects and advantages of the present invention will become better understood from a consideration of the following detailed description of the preferred embodiments and appended claims in conjunction with the drawings as described following:

DETAILED DESCRIPTION OF THE PREFERRED EMBODIMENT(S)

This invention, according to a preferred embodiment, relates to the fabrication of a thick cubic boron nitride (cBN) based composite film or coating, by using a sequential process that incorporates both a mechanical process and a chemical vapor infiltration (CVI) or other consolidation processes. The overall process allows for hitherto unrealized control over the density of the resulting layer. It also allows for the introduction of a gradient into the resulting cBN composite layer in certain embodiments, whereby the size of the cBN particles in the composite layer may change in size according to a desired gradient profile. The result is a material that may have far better adhesion qualities with respect to another material, such as a substrate, or with respect to the integration of the layer itself. In this way, a much thicker cBN layer may be applied, for example, to a substrate, such as used as a cutting tool insert for the cutting and forming of hard materials, such as steel. The resulting tool insert exhibits better resistance to delamination of the coating layer, and thus a longer tool life, which is particularly important for difficult cutting applications such as various forms of steel.

Figure 1A:
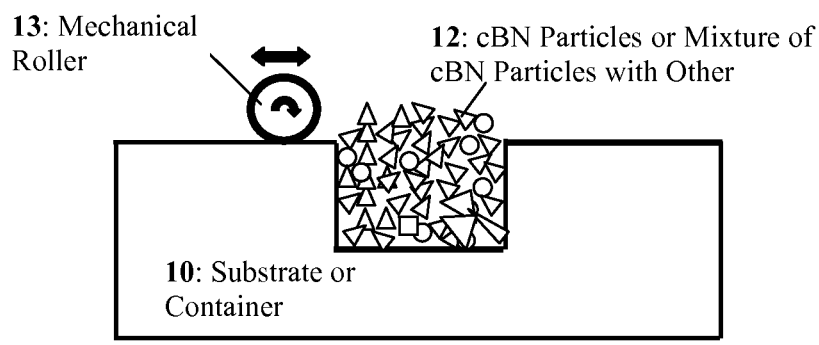
FIGS. 1A and 1B are illustrations of a first step according to a first preferred embodiment of the present invention.
Figure 1B:
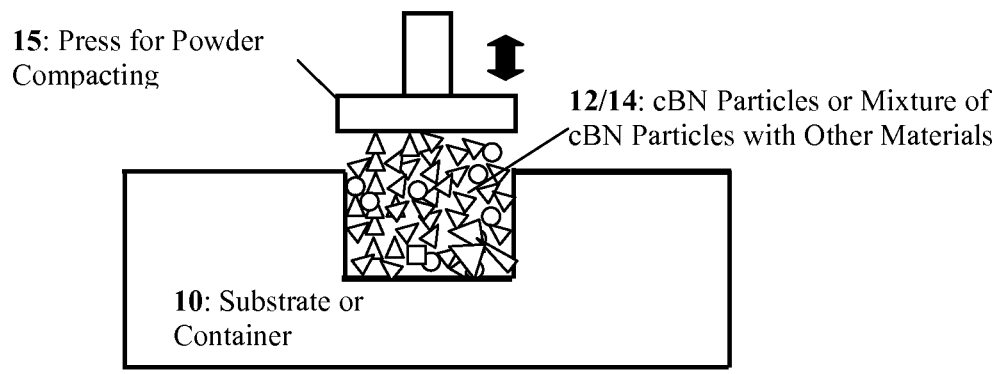

The process according to a preferred embodiment begins with a first step as illustrated in FIGS. 1A and 1B. Block 10 may be a substrate in the case where a coated substrate is desired, such as for cutting tool inserts. The substrate may be formed, for example, from carbides, ceramics, and steels. The dimensions of the substrate may be from a few millimeters to a few hundred millimeters in thickness. Block 10 may also be a container for forming the cBN composite layer according to the invention, such as where a wafer, or film, is desired that is not adhered to a substrate. In various embodiments, a coating preform may stay with block 10, or be removed from block 10 by using a thin, non-stick film as a separator (not shown). In the case where block 10 is functioning as a container, it may be formed of a sacrificial material. The resulting film can be diced and tailored to suit the application of interest.

Block 10 is preferably manufactured to include a mold, depression or shaped cavity into which material may be deposited. Block 10 is filled with a powdered pure or composite material 12, including cBN particles. As shown in FIG. 1A, a roller 13 may be used after physically filling the shaped cavity of block 10 in order to provide a desirably smooth surface. Agitation may be applied to the roller in order to improve performance. Particle sizes in material 12 may range from nanometer-sized to micron-sized particles, preferably in the range of about 50 nm to 10 μm.

Such particles as used in material 12 of the preferred embodiment may be sourced from commercial sources, or synthesized via chemical, mechanical, or thermal processes, as known in the art. The composite 12 may include, in addition to the cBN particles, various ceramic and binder materials. Ceramic materials include, for example, titanium nitride (TiN), titanium carbide (TiC), and titanium carbonitride (TiCN). Binders may be ceramic phases such as TiN and metallic phases include, for example, cobalt and nickel. Due to their physical properties, ceramic binders are preferred for high-temperature applications, while metallic phases are desired for regular wear- and impact-resistant applications.

The particles forming the composite of material 12 may be combined by mechanical milling processes, including, for example, by ball milling, in a variety of ratios. Mechanical milling, as known in the art, is a mixing and particle-refining process in which the materials of interest are mixed or refined by the kinetic energy generated by the movement of milling agents (balls or needles) and impact energy between the moving milling agents and the wall of a sealed container. In the preferred embodiment of the present invention, the cBN particle bimodal mixture is in the range of 200 nm to 4 μm, which is believed to be desirable for applications such as deep oil and gas drilling.

Up to the depth of the depression or notch that is formed in block 10, the thickness of the powdered material 12 may be controlled as desired for a particular application. In addition, the density of the material may be readily controlled by adjusting the pressure of roller 13 on the top of block 10, as shown in FIG. 1A, or of press 15 as shown in FIG. 1B. Press 15 functions to level and compact the physically-filled powder 12 that lies in block 10.

Figure 2A:
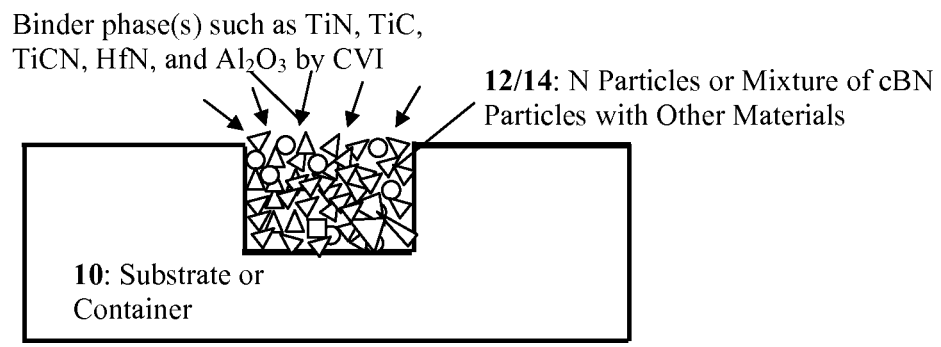
FIGS. 2A, 2B, and 2C are illustrations of a second step according to a first preferred embodiment of the present invention.
Figure 2B:
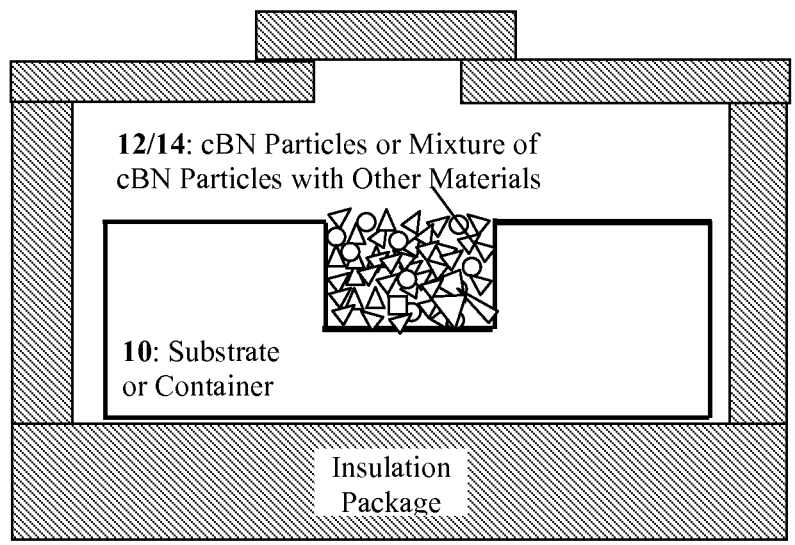
Figure 2C:
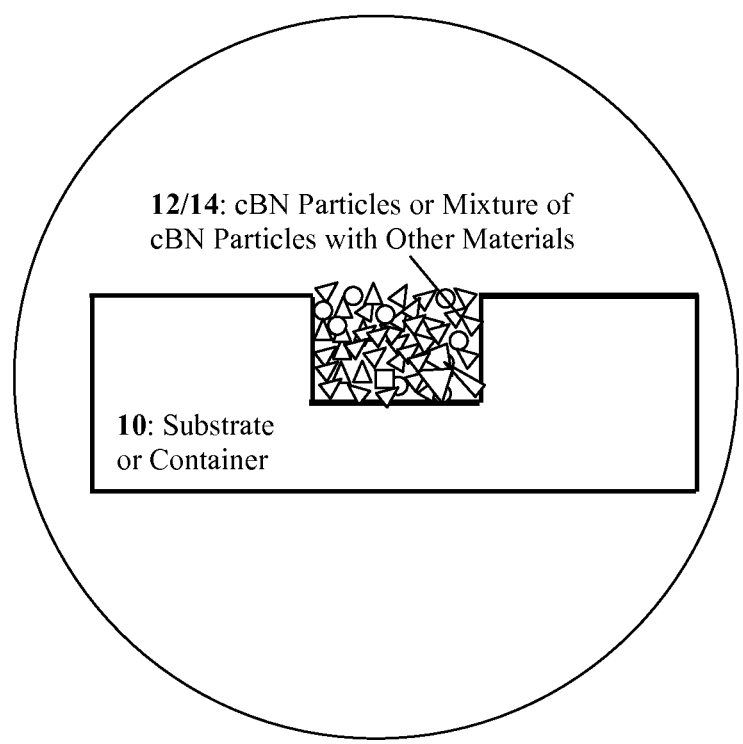
Figure 4:
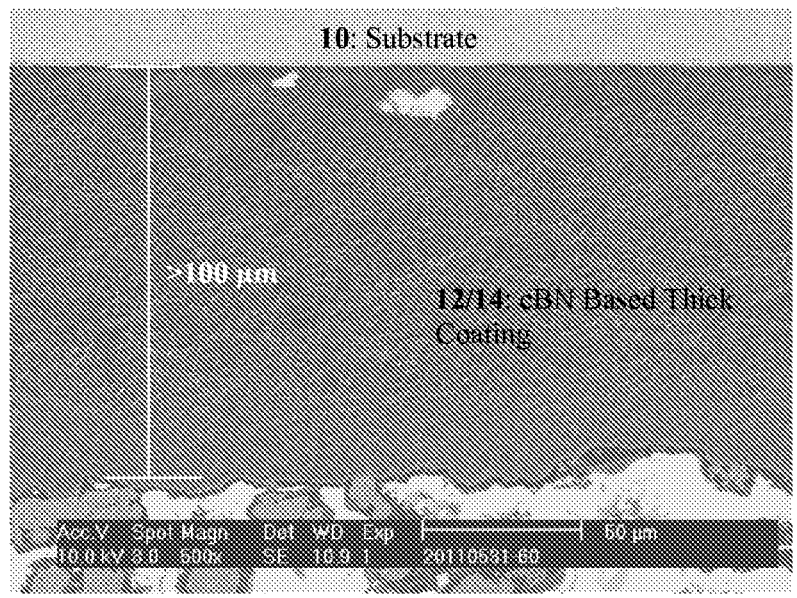
FIG. 4 is an SEM photograph showing a coated substrate according to a preferred embodiment of the present invention.

Referring now to FIGS. 2A-2C, powered material 12 that has been formed into layer 14 is subject to a consolidation process, which results in a solidification of layer 14. In a preferred embodiment, the consolidation process of layer 14 is performed by means of chemical vapor infiltration (CVI). The CVI technique is described, in a general fashion, in U.S. Pat. No. 6,607,782 to Malshe et al., which is incorporated herein by reference. During the CVI process, additional material is added to the matrix that forms layer 14 and is integrated into layer 14. This is possible due to the porosity of the material forming layer 14 at this stage of the process. Such additional material added during the CVI process may include, for example, various nitrides, carbides, carbonitrides, oxides, borides, and metallic phases. Particular materials may include, for example, titanium nitride (TiN), titanium carbide (TiC), titanium carbonitride (TiCN), and aluminum oxide ($Al_2O_3$). The time required for the CVI process is dependent upon the desired thickness of powdered material 12 as deposited as shown in FIGS. 1 and 2. It may vary, in a preferred embodiment, between about 120 min and 2400 min. The temperature of the CVI process depends upon the particular infiltrants used and the application, and may range, for example, from 850° C. to 1100° C. The chemicals used for the infiltration process depend upon the binder materials selected as known in the prior art. As shown in FIG. 2B, insulation may be used to maintain the temperature of powdered material 12. The result is shown in FIG. 2C. FIG. 4 provides an SEM photograph of a coated substrate according to a preferred embodiment of the present invention.

In alternative embodiments of the present invention, consolidation may be performed by microwave furnace heating or pulsed infrared (IR) heating in place of the CVI process. Such processes are well known in the art. In still other embodiments, the consolidation may be performed by sequential use of CVI processes and one or more additional processes, such as microwave furnace heating and pulsed infrared (IR) heating. The thickness of the composite layer 14 resulting from this process may vary, for example, from a few tens of microns up to 1000 µm. The hardness of the material depends upon the volumetric ratio of cBN particles within the mixture of materials forming composite layer 14, which in typical examples ranges from about 50% to 80%. The measured hardness of composite layer 14 is quite high, and in examples may vary from about 3200 HV to 4400 HV.

Figure 3:
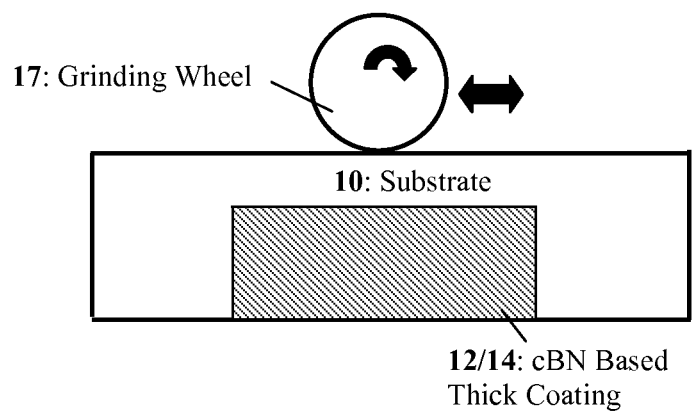
FIG. 3 is an illustration of a third step according to a first preferred embodiment of the present invention.

Referring now to FIG. 3, a process is illustrated according to a preferred embodiment for removing block 10 from the resulting wafer formed by composite layer 14 when no substrate is being employed. In this example, block 10 is removed from composite layer 14 by means of a mechanical grinding process using grinding wheel 17. As noted above, another method for removing composite layer 14 as a separate disk or wafer is to provide a thin, non-stick film (not shown) as are known in the art between block 10 and composite layer 14, so that composite layer 14 may be easily separated from block 10 upon completion of these processes.

The process as described herein can be used to generate a coating of various thicknesses, up to as much as 1000 microns in thickness or larger. The process may also be used to generating a coating of various sizes (length and width) in the range of a few millimeters to a few tens of millimeters. The process may result in a ceramic density of 50% to 80%, and in the case of a particle gradient, a gradient of particles sizes across the thickness ranging, for example, from about a nanometer up to tens of microns. The invention can be used to provide a composite cBN coating on a substrate, but also for a stand-alone wafer of cBN material. Applications include parts for deep oil and gas drilling, as well as cutting tools, such as for inserts used for cutting tools and machines. The invention may also, however, be applied to other applications, where wear resistance, erosion prevention, or corrosion protection, or thermal protection are desired qualities.

As used herein, "comprising" is synonymous with "including," "containing," or "characterized by," and is inclusive or open-ended and does not exclude additional, unrecited elements or method steps. As used herein, "consisting of" excludes any element, step, or ingredients not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

When a Markush group or other grouping is used herein, all individual members of the group and all combinations and subcombinations possible of the group are intended to be individually included in the disclosure.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. Thus, additional embodiments are within the scope of the invention and within the following claims.

In general the terms and phrases used herein have their art-recognized meaning, which can be found by reference to standard texts, journal references and contexts known to those skilled in the art. The preceding definitions are provided to clarify their specific use in the context of the invention.

All patents and publications mentioned in the specification are indicative of the levels of skill of those skilled in the art to which the invention pertains. All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention as set forth in the appended claims.

The invention claimed is:

1. A method for fabricating a hard composite, comprising:
   a. depositing into a notch of a form a composite material comprising (i) a plurality of cubic boron nitride (cBN) particles, and (ii) a plurality of particles selected from the group consisting of nitrides, carbides, carbonitrides, borides, oxides, carbon, and metallic phases;
   b. applying a mechanical press to the composite material in the notch of the form whereby the composite material is leveled and compressed; and
   c. applying a consolidation process to the composite material in the notch of the form, wherein the consolidation process is selected from the group consisting of chemical vapor infiltration (CVI), microwave sintering, and pulsed infrared (IR) heating;
   wherein a thickness of the composite material is controlled by depositing the composite material to a target height in the notch less than or equal to a total depth of the notch, further wherein the thickness of the composite material is between 30 µm and 1000 µm.

2. The method of claim 1, wherein the step of applying a consolidation process to the composite material comprises the step of infiltrating the composite material with a second material using a CVI process.

3. The method of claim 2, wherein the second material is selected from the group consisting of nitrides, carbides, carbonitrides, oxides, borides, carbon, and metallic phases.

4. The method of claim 3, wherein the particles forming the composite material range in size between 50 nm and 100 µm.

5. The method of claim 4, wherein the plurality of particles selected from the group consisting of nitrides, carbides, carbonitrides, borides, oxides, carbon, and metallic phases comprise particles selected from the group consisting of titanium nitride (TiN), titanium carbide (TiC), and titanium carbonitride (TiCN).

6. The method of claim 4, wherein the plurality of particles selected from the group consisting of nitrides, carbides, carbonitrides, borides, oxides, carbon, and metallic phases comprise particles selected from the group consisting of cobalt and nickel.

7. The method of claim 4, further comprising the step of mixing the composite material using a ball mill.

8. The method of claim 4, wherein the CVI process is performed for a time in the range of 120 min and 2400 min.

9. The method of claim 4, wherein the CVI process is performed at a temperature in the range of 850° C. to 1100° C.

10. The method of claim 4, wherein the form is a substrate.

11. The method of claim 4, wherein the form is a sacrificial material.

12. The method of claim 11, further comprising the step of grinding away the sacrificial material.

13. The method of claim 4, further comprising the step of inserting a thin film onto the form prior to the step of depositing the composite material.

14. The method of claim 4, further comprising the step of applying a roller to the composite material.

15. The method of claim 14, further comprising the step of agitating the roller during the step of applying a roller to the composite material.

16. A method for fabricating a hard composite, comprising:
   a. depositing into a notch of a form a composite material comprising (i) a plurality of cubic boron nitride (cBN) particles, and (ii) a plurality of particles selected from the group consisting of nitrides, carbides, carbonitrides, borides, oxides, carbon, and metallic phases, wherein a thickness of the composite material is controlled by depositing the composite material to a target height in the notch less than or equal to a total depth of the notch, further wherein the depositing step is performed to create a particle-size gradient across an entirety of the thickness of the composite material, wherein the particle-size gradient comprises an incremental change in cBN particle size;
   b. applying a mechanical press to the composite material in the form whereby the composite material is leveled and compressed; and
   c. applying a consolidation process to the composite material in the form, wherein the consolidation process is selected from the group consisting of chemical vapor infiltration (CVI), microwave sintering, and pulsed infrared (IR) heating.

17. The method of claim 16, wherein the step of applying a consolidation process to the composite material comprises the step of infiltrating the composite material with a second material using a CVI process.

18. The method of claim 16, wherein the second material is selected from the group consisting of nitrides, carbides, carbonitrides, oxides, borides, carbon, and metallic phases.

19. The method of claim 18, wherein the particles forming the composite material range in size between 50 nm and 100 μm.

20. The method of claim 19, wherein the plurality of particles selected from the group consisting of nitrides, carbides, carbonitrides, borides, oxides, carbon, and metallic phases comprise particles selected from the group consisting of titanium nitride (TiN), titanium carbide (TiC), and titanium carbonitride (TiCN).

21. The method of claim 19, wherein the plurality of particles selected from the group consisting of nitrides, carbides, carbonitrides, borides, oxides, carbon, and metallic phases comprise particles selected from the group consisting of cobalt and nickel.

22. The method of claim 19, further comprising the step of mixing the composite material using a ball mill.

23. The method of claim 19, wherein the CVI process is performed for a time in the range of 120 min and 2400 min.

24. The method of claim 19, wherein the CVI process is performed at a temperature in the range of 850° C. to 1100° C.

25. The method of claim 16, wherein the particle-size gradient comprises a smallest particle size of about 1 nm.

26. The method of claim 25, wherein the particle-size gradient comprises a largest particle size of about 30 μm.

27. The method of claim 19, wherein the form is a substrate.

28. The method of claim 19, wherein the form is a sacrificial material.

29. The method of claim 28, further comprising the step of grinding away the sacrificial material.

30. The method of claim 28, further comprising the step of inserting a thin film onto the form prior to the step of depositing the composite material.

31. The method of claim 28, further comprising the step of applying a roller to the composite material.

32. The method of claim 31, further comprising the step of agitating the roller during the step of applying a roller to the composite material.

* * * * *